(12) United States Patent
Basu et al.

(10) Patent No.: US 12,335,311 B2
(45) Date of Patent: Jun. 17, 2025

(54) STATEFUL MEDIA ACCESS CONTROL SECURITY SWITCHOVER SUPPORT

(71) Applicant: Arista Networks, Inc., Santa Clara, CA (US)

(72) Inventors: Sourav Basu, Hooghly (IN); Tarun Jaswanth, Bangalore (IN); Kaustav Majumdar, Bangalore (IN); Manish Singhvi, Jodhpur (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 332 days.

(21) Appl. No.: 17/835,633

(22) Filed: Jun. 8, 2022

(65) Prior Publication Data

US 2023/0403303 A1      Dec. 14, 2023

(51) Int. Cl.
*H04L 9/40*     (2022.01)
*H04L 9/08*     (2006.01)

(52) U.S. Cl.
CPC ............ *H04L 63/20* (2013.01); *H04L 9/0838* (2013.01); *H04L 63/162* (2013.01)

(58) Field of Classification Search
USPC .......................................................... 726/3
See application file for complete search history.

(56) References Cited

U.S. PATENT DOCUMENTS

| | | | | |
|---|---|---|---|---|
| 6,785,840 B1 * | 8/2004 | Smith | ................. | G06F 11/2007 710/305 |
| 11,539,513 B1 * | 12/2022 | Hussain | .............. | H04L 65/1069 |
| 11,606,390 B1 * | 3/2023 | Grammel | ................ | H04L 45/60 |
| 2003/0130833 A1 * | 7/2003 | Brownell | ............ | H04L 67/1097 703/23 |
| 2006/0092940 A1 * | 5/2006 | Ansari | ..................... | H04L 45/00 370/392 |
| 2006/0156403 A1 * | 7/2006 | Haeffele | ............. | H04L 63/1441 726/23 |
| 2008/0205650 A1 * | 8/2008 | Forsberg | ............... | H04L 9/0891 380/272 |
| 2009/0328027 A1 * | 12/2009 | Tsuchiya | ............... | H04L 43/103 714/47.1 |

(Continued)

FOREIGN PATENT DOCUMENTS

WO     WO-2016115409 A1 *    7/2016    .............. G06F 11/20

OTHER PUBLICATIONS

802.1X-2020—IEEE "Standard for Local and Metropolitan Area Networks—Port-Based Network Access Control", Dec. 10, 2014, Accessed online at https://ieeexplore.ieee.org/servlet/opac?punumber=9018452. IEEE Xplore (107 pages).

*Primary Examiner* — Sakinah White Taylor
(74) *Attorney, Agent, or Firm* — Fountainhead Law Group, PC (57) ABSTRACT

A method for managing a group of secured network devices. The method includes detecting, by a switchover agent operating in a secured network device of the group of secured network devices, a switchover between two supervisors operating in the secured network device, based on the detecting: generating a modified heartbeat packet, wherein the modified heartbeat packet comprises a suspension time that is significantly larger than a heartbeat interval, and sending the modified heartbeat packet to a second secured network device of the group of secured network devices.

20 Claims, 4 Drawing Sheets

(56) References Cited

U.S. PATENT DOCUMENTS

| | | | | |
|---|---|---|---|---|
| 2018/0324577 A1* | 11/2018 | Faccin | ............... | H04W 76/27 |
| 2020/0192772 A1* | 6/2020 | Asveren | ............. | G06F 11/2023 |
| 2020/0259834 A1* | 8/2020 | Hussain | ............... | H04L 43/10 |
| 2020/0285210 A1* | 9/2020 | Gupta | ................. | G06F 16/21 |
| 2022/0167469 A1* | 5/2022 | Bequet | ............... | G06F 9/4881 |

\* cited by examiner

STATEFUL MEDIA ACCESS CONTROL SECURITY SWITCHOVER SUPPORT

BACKGROUND

Network devices are typically designed to continue to operate when a portion of the network device fails. More specifically, network devices may have components that are on "standby" and are used, e.g., when the corresponding "active" components fail or need to be upgraded. During a switchover between the active and standby components of a network device, the network device may be unable to install any new configurations from external entities.

DETAILED DESCRIPTION

During operation of a network, one or more network devices in the network may implement security measures to provide security in the network. The network devices that implement the security measures (also referred to as "secured network devices") may communicate within groups of other secured network devices to negotiate security information such as, for example, secure association keys (SAKs).

In a group of secured network devices (e.g., a media access control security (MACsec) group), one secured network device may be deemed a key server. The key server provides SAKs to the other secured network devices for the purpose of installation. The installation of SAKs on the other secured network devices enables the secured network devices to perform the security measures such as, for example, encryption of packets prior to transmitting the packets, decryption of encrypted packets received from a network device, authorization of network devices sending packets to the secured network devices, and/or other security measures without departing from this disclosure.

Each secured network device in a MACsec group may operate using protocols such as, for example, a MACsec Key Agreement (MKA). The MKA may be used to manage the authentication of communication between the secured network devices in the MACsec group. For example, secured network devices in the MACsec group may send heartbeat packets at predetermined times (also referred to as heartbeat intervals) to provide other secured network devices in the MACsec group information about their availability. The heartbeat packets may be, for example, MKA protocol data units (MKPDU). For example, a heartbeat packet may be sent every two seconds from a first secured network device to a second secured network device. The second secured network device may expect a heartbeat packet from the first secured network device every two seconds. In this example, if no heartbeat packet is obtained after six seconds (e.g., after three expected heartbeat packets are not obtained), the second secured network device may determine that the first secured network device is disconnected from the network.

A secured network device may operate using a control plane that includes two supervisors. Each supervisor may be stateful. Said another way, the state information maintained by each supervisor is periodically synchronized between the supervisors such that when there is a switchover (e.g., when the supervisors switch between active and standby states), the state information (discussed above) has been transferred to the new active supervisor prior to the switchover. In this manner, the switchover that occurs may be referred to as a stateful switchover.

As discussed above, each supervisor is either in an active or standby state. For example, one supervisor may be in an active state while a second supervisor is in the standby state. The supervisors may include functionality for managing the operation of any number of controlled devices (e.g., line cards) of a secured network device. During such operation, a second supervisor (also referred to as the standby supervisor or the passive supervisor) may be on standby and ready to take over operation of the first supervisor should that first supervisor experience a failure. The process of switching the operation from the first supervisor (also referred to as the active supervisor) to the standby supervisor may be referred to as a switchover. A switchover may be initiated by, e.g., a user, or occur when a standby supervisor detects that an active supervisor is being rebooted. The switchover may be caused based on an unexpected event (e.g., a failure on the active supervisor) that forces the standby supervisor to take over the operation as the new active supervisor.

A switchover may occur over the course of several seconds or several minutes. This time may be significantly longer than a heartbeat interval. During a switchover, communication between the secured network device and other network devices may become severely limited. This may result in, for example, dropped packets and dropped SAKs obtained during the switchover. In conventional implementations, the key server of a group of secured network devices may not be made aware of a switchover. During the time it takes the switchover process to complete, a key server, not aware of the switchover by a secured network device, may attempt to send new SAKs to the secured network device for installation. This attempt may result in a failure to install the SAKs by the secured network device, thus compromising the integrity of the security measures by the secured network device caused by the secured network device not having the newest SAK(s) installed.

Embodiments disclosed herein include methods and systems for notifying the key server in a MACsec group when a switchover occurs. Embodiments include utilizing a switchover agent in a secured network device that monitors the supervisors for any switchovers, and, after detecting an initiation of a switchover, modifying the next heartbeat packet sent to the key server, based on a potential length of time for the switchover to be completed. The heartbeat packet may be modified by modifying a MKA suspension time (also referred to as a suspension time) of the heartbeat packet, which indicates the amount of time the secured network device would like the key server to wait before transmitting any new SAKs to the secured network device undergoing the switchover. The key server, after receiving the modified heartbeat packet, suspends the installation of any new SAKs to the secured network devices in the MACsec group and continues to use the most recently-installed SAKs.

In one or more embodiments, the modified heartbeat packet may be sent after every expected interval of time (e.g., after every two seconds), but the MKA suspension time may decrease after each heartbeat packet to count down the expected completion of the switchover. For example, after the initial detection of the switchover, the switchover agent may send a first modified heartbeat packet with a MKA suspension time of 120 seconds. After two seconds, a second modified heartbeat packet is sent with a MKA suspension time of 118 seconds (i.e., two seconds less than the first MKA suspension time). Any subsequent modified heartbeat packets may continue to count down the MKA suspension time.

In such scenarios in which the switchover is not complete after 120 seconds (or if the switchover agent anticipates that the switchover will not be completed within the remaining MKA suspension time), the switchover agent may send a second modified heartbeat packet with a MKA suspension time having a greater value, and a new countdown begins. For example, if the MKA suspension time has reached two seconds, and the switchover agent determines that the switchover is not complete, the next modified heartbeat packet may specify a MKA suspension time of 120 seconds. The subsequent MKA suspension times will return to counting down based on the remaining suspension time.

In such embodiments in which the switchover is detected to be complete before the MKA suspension time reaches zero, the switchover agent may send another modified heartbeat packet with a MKA suspension time of zero, indicating to the key server that the switchover is complete. Upon receiving such modified heartbeat packet, the key server ends its suspension, and any new keys may be installed to the secured network devices in the MACsec group thereafter.

The following describes one or more embodiments of disclosure.

Figure 1:
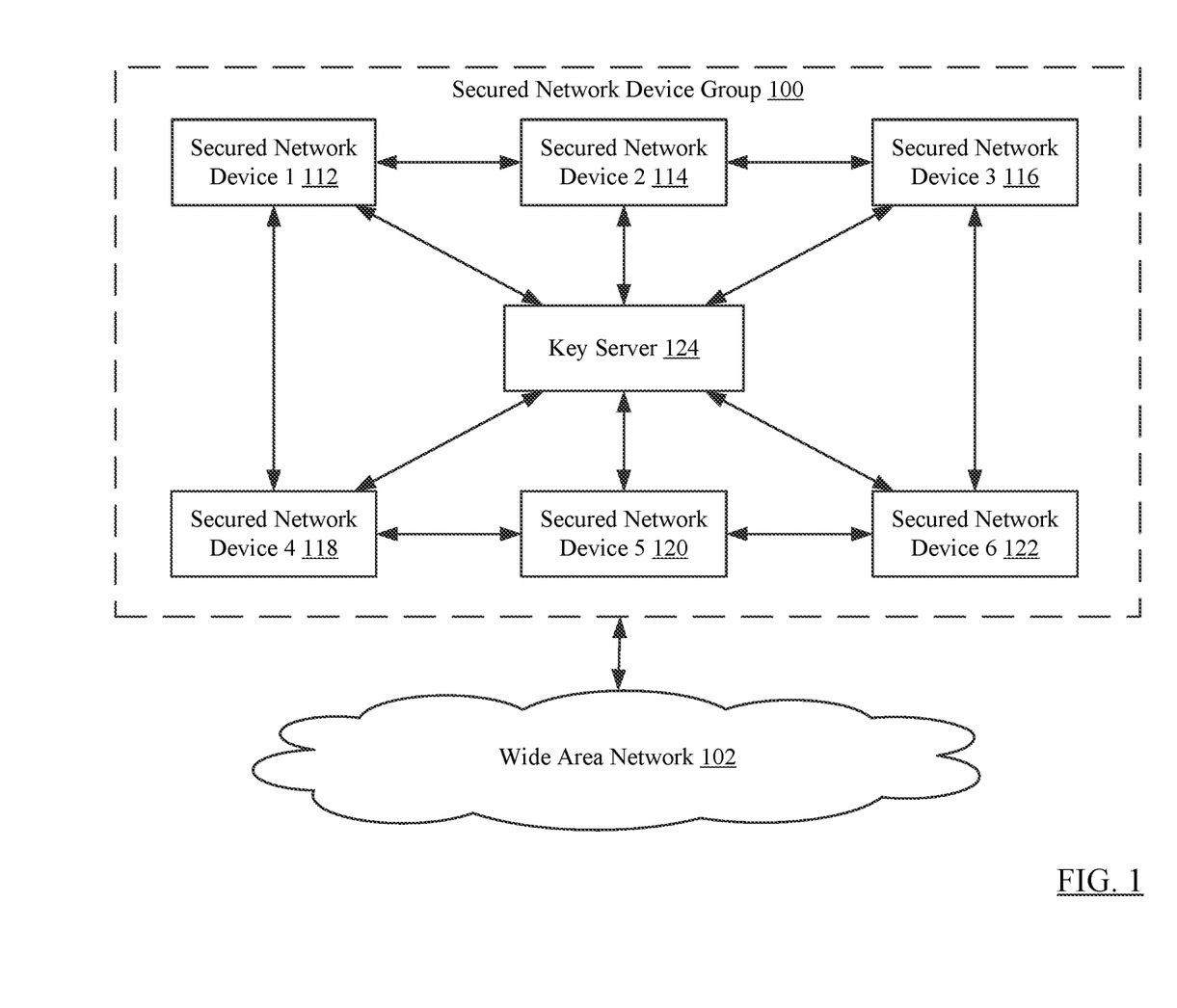
FIG. 1 shows a diagram of a system in accordance with one or more embodiments.

FIG. 1 shows a system in accordance with one or more embodiments of the disclosure. In one or more embodiments disclosed herein, the system includes a secured network device group (100) connected to a wide area network (102). As shown in FIG. 1, the secured network device group (100) includes secured network devices (e.g., secured network device 1 (112), secured network device 2 (114), secured network device 3 (116), secured network device 4 (118), secured network device 5 (120), secured network device 6 (122)) and a key server (124) operating within or using a network (102) (which may be a local network, a wide area network or any combination thereof). Each of these components is described below.

In one embodiment of the disclosure, the secured network devices (112, 114, 116, 118, 120, 122) are physical devices that include persistent storage, memory (e.g., random access memory), one or more processor(s) (including a switch chip), and two or more physical ports. In one embodiment of the disclosure, the switch chip is hardware that determines which egress port on a network device to forward media access control (MAC) frames. The switch chip may include egress and ingress ports that may connect to ports on the network device. Each port may or may not be connected to another device (e.g., a server, a switch, a router, etc.). The secured network device may be configured to receive packets via the ports and determine whether to: (i) drop the packet; (ii) process the packet in accordance with one or more embodiments of the disclosure; and/or (iii) send the packet, based on the processing, out another port on the secured network device. While the aforementioned description is directed to network devices that support Ethernet communication, the disclosure is not limited to Ethernet; rather, the disclosure may be applied to the secured network devices (112, 114, 116, 118, 120, 122) using other communication protocols. The communication between the entities (114, 116, 118, 120, 122, 124) in the secured network device group (100) may include any combination of direct and/or indirect connections. For additional details regarding the secured network device devices (112, 114, 116, 118, 120, 122), see, e.g., FIG. 2.

In one or more embodiments disclosed herein, the secured network devices (112, 114, 116, 118, 120, 122) and the key server (124) operate and/or communicate with each other using a secured protocol. The secured protocol may be a protocol that includes implementing security measures to prevent undesired entities (e.g., malicious entities) from transmitting messages to the secured network device group (100). In one or more embodiments, the secured protocol is a MACsec protocol. Implementing the MACsec protocol by an entity of the secured network device group (100) may include security measures such as encryption of packets prior to transmission to a second entity and decryption of obtained encrypted packets.

In one or more embodiments, the encryption and/or decryption of the packets in accordance with the MACsec protocol includes the use of secure association keys (SAKs). In one or more embodiments, the SAKs are data structures that an entity of the secured network device group (e.g., the key server (124) or a secured network device (112, 114, 116, 118, 120, 122)) may use to perform the encryption or decryption. For example, an entity may perform an encryption algorithm on a packet (or portion thereof) using the SAK to generate an encrypted packet. As a second example, the entity may apply a decryption algorithm on an encrypted packet using the SAK to decrypt the encrypted packet. Examples of encryption algorithms include, but are not limited to: advanced encryption standards (AES), data encryption standard (DES), and Rivest Cipher 4 (RC4).

In one or more embodiments disclosed herein, the SAKs used in a secured network device group (100) are shared by all entities in the secured network device group (100). The key server (124) may include functionality for managing the distribution and/or installation of SAKs on the secured network devices (112, 114, 116, 118, 120, 122). In one or more embodiments, the key server (124) manages the distribution by generating the SAKs and transmitting the generated SAKs to the secured network devices (112, 114, 116, 118, 120, 122). The key server (124) may generate the SAKs based on security policies implemented by the key server (124). The security policies may specify, for example, a schedule for generating new SAKs. By implementing such security policies through the generation and transmission of new SAKs, the key server (124) indicates to the secured network devices (112, 114, 116, 118, 120, 122) that any previous SAKs are no longer viable for communication in accordance with the secured protocol.

In one or more embodiments, implementing the secured protocol further includes transmitting heartbeat packets by the secured network devices (112, 114, 116, 118, 120, 122) to the key server (124) at predetermined periods of time (hereinafter referred to as a heartbeat interval). The heartbeat interval may be, for example, two seconds. Other intervals may be used without departing from the disclosure. Implementing the secured protocol may further include determining, by the key server (124), if after three heartbeat intervals, no heartbeat packets are obtained from a secured network device, that the secured network device is deemed disconnected from the network. The present disclosure is not limited to deeming that the secured network device is disconnected from the network after three heartbeat intervals.

As discussed above, the implementation of the secured protocols indicates to the secured network devices (112, 114, 116, 118, 120, 122) that any previous SAKs are to not be used for future communication. Consequently, a secured network device (112, 114, 116, 118, 120, 122) that has not installed the latest SAK will not be up to date with the secured protocol. An example of a cause for a secured network device not being up to date may be that the secured network device is undergoing a switchover. A switchover (discussed below in FIG. 2) may prevent the secured network device (112, 114, 116, 118, 120, 122) from installing a new SAK transmitted by the key server (124). As such, it may be beneficial for the secured network device to notify the key server (124) of the switchover and to request a suspension of any key installations until the secured network device has completed the switchover. The process of managing the suspension by the secured network device in response to a switchover is discussed in the method of FIG. 3. Further, the process of managing the suspension by the key server is discussed in the method of FIG. 4.

In embodiments in which the key server (124) is the network device undergoing the switchover, the key server (124) may notify the secured network devices (112, 114, 116, 118, 120, 122) of the switchover, as discussed below.

While the key server (124) is illustrated in FIG. 1 as a separate entity, the key server (124) may be implemented as one of the secured network devices (112, 114, 116, 118, 120, 122). The key server may be a secured network device (112, 114, 116, 118, 120, 122) selected (e.g., by an administrator) to perform the functionality of the key server (124) discussed throughout the disclosure. Alternatively, the key server (124) may be implemented as an external entity. The external entity may be, for example, a computing device.

In one or more embodiments of the disclosure, a computing device is any device or any set of devices capable of electronically processing instructions and may include, but is not limited to, any of the following: one or more processors, memory (e.g., random access memory (RAM)), input and output device(s), persistent storage, one or more physical interfaces (e.g., network ports), any number of other hardware components (not shown) (e.g., light emitting diodes (LEDs), optical transceivers, network chips, etc.) or any combination thereof. Examples of computing devices include, but are not limited to, a server (e.g., a blade-server in a blade-server chassis, a rack server in a rack, etc.), a desktop computer, a mobile device (e.g., laptop computer,) and/or any other type of computing device with the aforementioned requirements.

Figure 2:
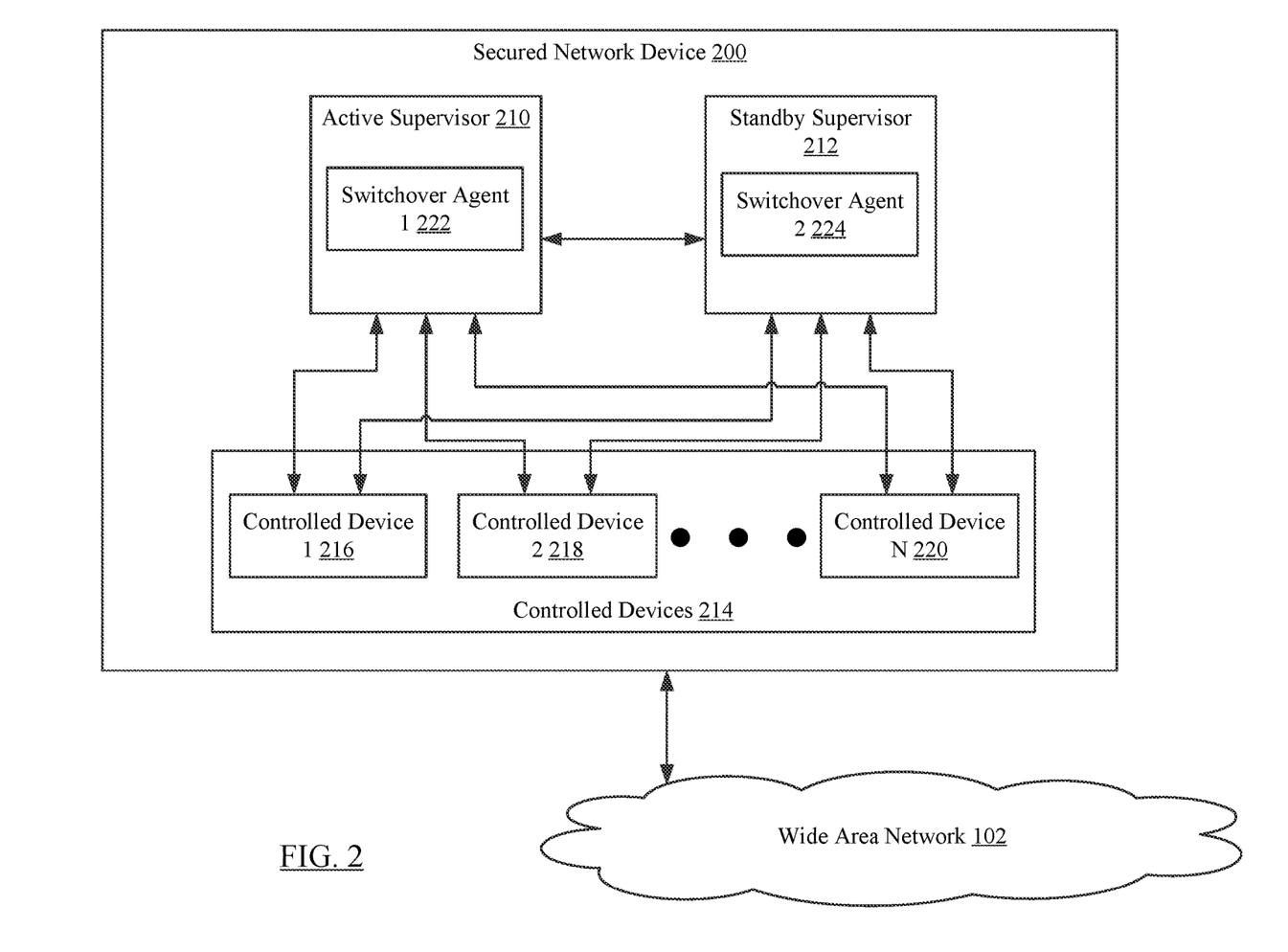
FIG. 2 shows a diagram of a secured network device in accordance with one or more embodiments.

FIG. 2 shows a diagram of a secured network device in accordance with one or more embodiments of the disclosure. In one or more embodiments of the disclosure, the secured network device (200) includes an active supervisor (210), a standby supervisor (212), and controlled devices (214). As shown in FIG. 2, the controlled devices (214) include controlled device 1 (216), controlled device 2 (218), and controlled device N (220). Each of these components is described below.

In one or more embodiments of the disclosure, a controlled device (e.g., controlled device 1 (216), controlled device 2 (218), controlled device N (220)) is any hardware (e.g., circuitry) and/or combination of hardware and software that includes functionality to perform all or any portion of any functionality of the secured network device (200). In one or more embodiments of the disclosure, a controlled device (e.g., controlled device 1 (216), controlled device 2 (218), controlled device N (220)) is included in a computing device and/or may be operatively connected to a computing device. As used herein, the phrase 'operatively connected' refers to any direct (e.g., wired directly between two devices) or indirect (e.g., wired and/or wireless connections between any number of devices connecting the operatively connected devices) connection. Non-limiting examples of controlled devices are included below.

In one or more embodiments of the disclosure, a controlled device (e.g., controlled device 1 (216), controlled device 2 (218), controlled device N (220)) is any single device, any component of a device, any aggregate of devices, any aggregate of components of a device, or any aggregate of components of multiple devices. Thus, as used herein, multiple devices and/or components may collectively be termed a "controlled device".

Examples of a controlled device (e.g., controlled device 1 (216), controlled device 2 (218), controlled device N (220)) include, but are not limited to, a switch, a line card, a fabric card, an individual port on line card, a central processing unit (CPU), a system control device (SCD), a supervisor (described below), a power supply unit (PSU), a network chip, a router, an access point, a computing device, a fan, an optical transceiver, a light emanating device (e.g., a LED), a Power Over Ethernet (POE) port and/or device, any multiple of these devices, or any other device(s) that may be powered by a PSU. As another example, a controlled device (e.g., controlled device 1 (216), controlled device 2 (218), controlled device N (220)) may be an aggregation of multiple components of two or more devices (e.g., various display indicator LEDs of multiple devices). Further, an SCD may be a device that interacts with software (e.g., agents) and provides the ability to control any type of component of the system.

In one or more embodiments of the disclosure, a supervisor (e.g., active supervisor (210), standby supervisor (212)) is any hardware (e.g., circuitry), software, firmware, and/or combination thereof that includes functionality to receive information (e.g., from controlled devices (214)) and/or perform one or more actions related to one or more controlled devices (214). In one or more embodiments of the disclosure, a supervisor includes functionality to receive, organize, interpret, store, and/or take one or more actions in response to information regarding devices (e.g., controlled devices (214)) to which it is operatively connected. Further, in one or more embodiments of the disclosure, a supervisor may be able to send commands to any device to which it is operatively connected.

Examples of a supervisor include, but are not limited to, software, a SCD, any one or more integrated circuits (ICs), a field programmable gate array (FPGA), an application specific integrated circuit (ASIC), a microcontroller, any device capable of being programmed with device logic and/or capable of executing instructions for performing various operations, and/or any combinations thereof.

Additionally, as shown in FIG. 2, each supervisor (210, 212) may independently operatively connect to each controlled device (216, 218, 220). Further, the active supervisor (210) and the standby supervisor (212) may be operatively connected to each other. The operative connections between each supervisor (210, 212) and each controlled device (216, 218, 220) may occur over a single wire or multiple of wires. One of ordinary skill in the art and having the benefit of this disclosure would appreciate that any form of suitable communication between the supervisors (210, 212) and the controlled devices (216, 218, 220) may be employed. Further, each supervisor (210, 212) may not be connected to each controlled device (216, 218, 220) independently. Rather, the supervisors (210, 212) may share connections between each controlled device (216, 218, 220). Additionally, certain controlled devices (216, 218, 220) may be connected to only one supervisor (e.g., active supervisor (210)), while other controlled devices (216, 218, 220) may be connected to another supervisor (e.g., standby supervisor (212)).

In one or more embodiments, the active supervisor (210) and the standby supervisor (212) are operatively connected to enable communication between the two supervisors (210, 212). Further, as each supervisor (210, 212) may be independently connected to each controlled device (216, 218, 220), each supervisor (210, 212) may independently collect data from each controlled device (216, 218, 220).

In one or more embodiments, the active supervisor (210) may manage the operation of the controlled devices (214) while in an active mode. The active mode may refer to a setting of the active supervisor (210) to perform the functionality of the active supervisor (210) that may include, for example, managing the power consumption of the controlled devices (214), managing the computing usage of the controlled devices (214), and/or any other management of the controlled devices (214). In contrast, the standby supervisor (212) may operate in a standby mode. The standby mode may refer to a setting in which the standby supervisor (212) is on standby to wait to take on the active mode should the active supervisor (210) be unable to continue the operation of the active mode.

In one or more embodiments, the role of active supervisor may be switched between the two supervisors (210, 212). The active mode may be switched from one supervisor (e.g., the active supervisor (210)) to the second supervisor (e.g., the standby supervisor (212)). The switching of the active mode from one supervisor to another may be referred to as a switchover. In this manner, while one supervisor is labeled as an active supervisor (210), and a second supervisor is labeled as a standby supervisor (212), either of the two supervisors may serve the role of active supervisor or standby supervisor at a point in time. In contemporary operations, at least one of the two supervisors (210, 212) is to perform the role of active supervisor. Further, in contemporary operations, only one of the supervisors may perform the operation of the active supervisor.

In one or more embodiments, while not shown in FIG. 2, each supervisor (210, 212) includes a switchover agent (e.g., switchover 1 (222) and switchover 2 (224). The switchover agent (222, 224), when executed on the respective supervisor (210, 212), monitors the respective supervisor (210, 212) for a switchover (e.g., initiated by a user, initiated based on a failure by the active supervisor (210), initiated based on a switchover policy, etc.). In the scenario where the secured network device undergoes a switchover, the switchover agent (222, 224) of the standby supervisor taking on the role of the active supervisor manages the communication between the secured network device (200) and the key server (124, FIG. 1) to suspend the installation of any SAKs until after completion of a detected switchover, in accordance with FIG. 3.

As discussed above, embodiments disclosed herein may include the key server undergoing the switchover. In such embodiments, the key server suspends the generation and installation of new SAKs and notifies the other secured network devices (e.g, 200) of the suspension via a modified heartbeat packet to continue to implement previously installed keys until the key server sends a second notification confirming completion of the switchover.

While the switchover agents (222, 224) are illustrated in FIG. 2 as being a part of (or executing on) their respective supervisors (222, 224), a switchover agent in accordance with embodiments of this disclosure may execute externally to the active supervisor (222) and the standby supervisor (212). In such embodiments, the external switchover agent may perform the monitoring for both supervisors (222, 224) and further perform the functionality discussed throughout this disclosure.

In one or more embodiments, a secured network device such as that shown in FIG. 2, also includes software and/or firmware stored in any data repository (not shown) and/or memory (not shown) (i.e., non-transitory computer readable mediums). Such software and/or firmware may include instructions which, when executed by the one or more processors (not shown) of the system, cause the one or more processors to perform operations in accordance with one or more embodiments of the disclosure. The instructions may be in the form of computer readable program code to perform embodiments of the disclosure, and may be stored, in whole or in part, temporarily or permanently, on a non-transitory computer readable medium such as optical media (e.g., compact disc (CD), digital versatile disc (DVD), etc.), magnetic storage (e.g., hard disk drive (HDD), floppy disk, tape, diskette, etc.), integrated circuit storage (e.g., flash memory, solid-state drive (SSD), etc.), storage device, physical memory, or any other computer readable storage medium.

While FIG. 2 shows a configuration of components, other configurations may be used without departing from the scope of the disclosure. For example, although controlled devices (214) are shown with only three distinct devices, controlled device 1 (216), controlled device 2 (218), and controlled device N (220), one of ordinary skill in the art and having the benefit of this Detailed Description would appreciate that there can be any number of controlled devices in the disclosed system. Accordingly, embodiments disclosed herein should not be limited to the configuration of components shown in FIG. 2.

Figure 3:
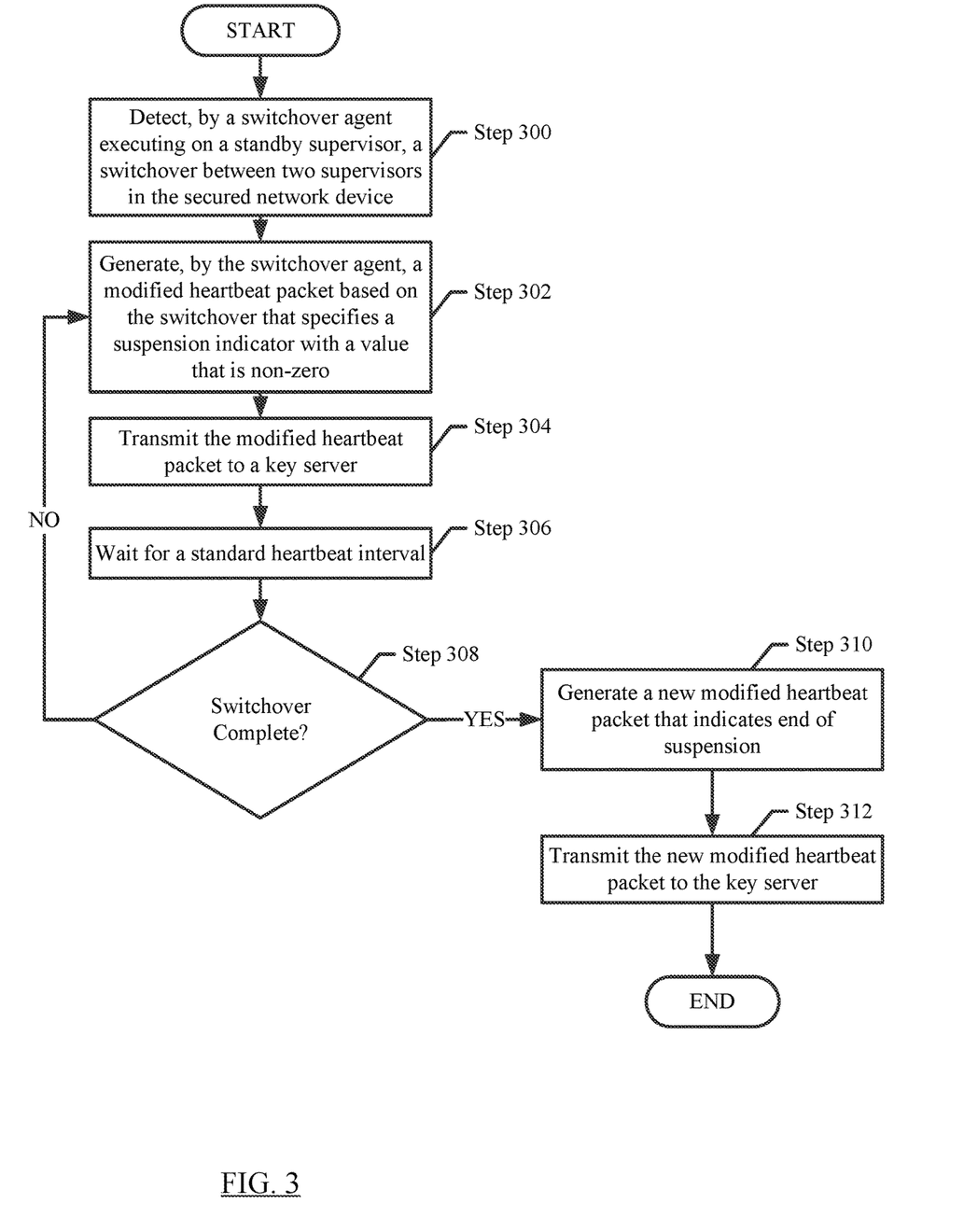
FIG. 3 shows a flowchart for a method for initiating a switchover of a supervisor in accordance with one or more embodiments.

FIG. 3 shows a flowchart for a method for initiating a switchover of a supervisor in accordance with one or more embodiments. The method of FIG. 3 may be performed by, for example, a switchover agent of a supervisor (e.g., 210, 212, FIG. 2). The supervisor may be one operating on the secured network device (112, 114, 116, 118, 120, 122, FIG. 1) that is not the key server. Other components illustrated in FIGS. 1-2 may perform the method of FIG. 3 without departing from the disclosure. Further, one or more steps in FIG. 3 may be performed concurrently with one or more steps in FIGS. 3-4.

In step 300, a switchover is detected between the two supervisors in the secured network device. The switchover may be occur in response to, e.g., one or more of the following events: failure of the active supervisor, receipt of a request, e.g., issued by an administrative system, to switch the roles of the two supervisors, failure of the active supervisor to boot, performance of a policy that specifies a periodic switchover to be implemented, etc. The switchover agent may detect when one or more of the aforementioned events occurs. Alternatively, other components in the secured network device may detect one or more of the aforementioned events and issue a notification to the switchover agent that a switchover has been initiated. In this scenario, the switchover agent is deemed to have detected the switchover once it receives the notification.

In step 302, a modified heartbeat packet is generated and includes a suspension indicator with a value that is non-zero.

In one or more embodiments, the suspension indicator is a portion of a parameter set of a heartbeat packet that is organized as a MKPDU. The parameter set may include, for example, a set of predetermined parameters that may be modified such that, when read by a recipient (e.g., the key server), indicates predetermined information. In such embodiments, one of the parameters in the parameter set may include the suspension indicator. The suspension indicator may be a suspension time. The suspension time may be a non-zero numerical value that represents a number of seconds that the key server is to suspend the installation of new SAKs. The modified heartbeat packet may indicate a suspension time that is significantly larger than the heartbeat interval. For example, the suspension time may be 120 seconds, in contrast to a heartbeat interval of two seconds. The disclosure is not limited to the 120 second suspension time.

In one or more embodiments, the suspension time specified in the first modified heartbeat packet is based on a predetermined value and applied following the initial detection of the switchover. Following any subsequent modified heartbeat packets (e.g., after the method proceeds back to step 302 following step 308), the suspension time is reduced by a heartbeat interval. For example, a first modified heartbeat packet may specify a suspension time of 120 seconds. After the switchover is determined to not be complete in accordance with step 308, a second modified heartbeat packet is generated that specifies a suspension time of 118 seconds. In this manner, the suspension time of the most recent modified heartbeat packet indicates an estimated time to completion for the switchover. The suspension time may be used as a countdown counter.

In one or more embodiments, e.g., after the method proceeds back to step 302 following step 308, the suspension time indicated in the modified heartbeat packet may reach a value below a predetermined threshold. In such embodiments, the switchover agent may make a determination about whether the switchover is expected to complete within the current suspension time. If the switchover agent determines that the switchover will not be complete before the suspension time reaches zero, the switchover agent may send a modified heartbeat packet with a suspension time that returns to a starting counter (e.g., 120) seconds. Following this, any future modified heartbeat packets may continue to count down based on the previous modified heartbeat packet.

In step 304, the modified heartbeat packet is transmitted to the key server. The modified heartbeat packet may be provided after the heartbeat interval has elapsed and steps 300-302 have been performed.

In step 306, the switchover agent waits for a heartbeat interval. During this period of time in which the switchover agent waits for the heartbeat interval, the key server may continue suspension of the key installation and/or distribution.

In step 308, a determination is made about whether the switchover is complete. The determination is made based on continued monitoring of the status of switchover by the switchover agent. In one or more embodiments, the switchover agent is monitoring the state of the supervisor that will become the supervisor after the switchover is complete in order to determine if this supervisor has successfully become the active supervisor. The criteria for a completed switchover may include, for example, a determination that one or more hardware agents are initialized in the hardware and a second determination that the hardware of the secured network device is capable of installing new keys. Other criteria may be used to deem the switchover complete without departing from the disclosure. If the switchover is deemed complete, the method proceeds to step 310; otherwise, the method proceeds to step 302. When the method returns to step 302, new modified heartbeat packets are generated as discussed above. Steps 302-308 may be continually repeated until the switchover has been successfully completed.

When the switchover is determined to have been successfully completed in step 308, then in step 310, a new modified heartbeat packet is generated that indicates the end of the suspension. In one or more embodiments, the new modified heartbeat packet indicates the end of the suspension using the suspension time. For example, the suspension time may be a value of zero. In this manner, the key server may use the suspension time of zero to determine that it may end the suspension of the key installation. Other values may be used to signal the end of the suspension to the key server without departing from the disclosure.

In step 312, the new modified heartbeat packet is transmitted to the key server.

While the suspension indicator in FIG. 3 has been described as using a suspension time in a modified heartbeat packet that decreases over time, the suspension indicator may be implemented using a first constant value (e.g., a non-zero value) used to indicate continuing the suspension and a different constant value that used to indicate the end of the suspension (e.g., a value of zero). In this embodiment, if the switchover is not completed, the modified heartbeat packet includes a suspension indicator with the first constant value, and when the switchover is completed, the modified heartbeat packet includes the second constant value. In this embodiment, each time step 302 is performed, the same suspension indicator is used (i.e., the first constant value).

While FIG. 3 only discusses the switchover agent sending modified heartbeat packets, the switchover agent may send additional heartbeat packets in accordance with the security policies implemented by the secured network device. For example, if the secured network device is implementing a MACsec protocol during communication with the key server, the secured network device may send heartbeat packets (e.g., MKPDUs) not modified with the suspension time at the predetermined heartbeat interval (e.g., every two seconds).

While FIG. 3 is performed by a secured network device that is not a key server, the key server may also undergo a switchover. In such embodiments, the key server sends a modified heartbeat packet to the secured network devices to indicate that operation should continue using the most recently-distributed SAKs. The modified heartbeat packets may include a suspension indicator. The suspension indicator may be a non-zero value that indicates continued suspension (e.g., similar to step 302). The key server may continue to distribute modified heartbeat packets (e.g., in accordance with steps 302-308 of FIG. 3) to the other secured network devices. After the switchover is deemed complete, the key server may send a new modified heartbeat packet that indicates an end to the suspension. In this embodiment, the key server may continue to implement the security policies as discussed throughout the disclosure.

Figure 4:
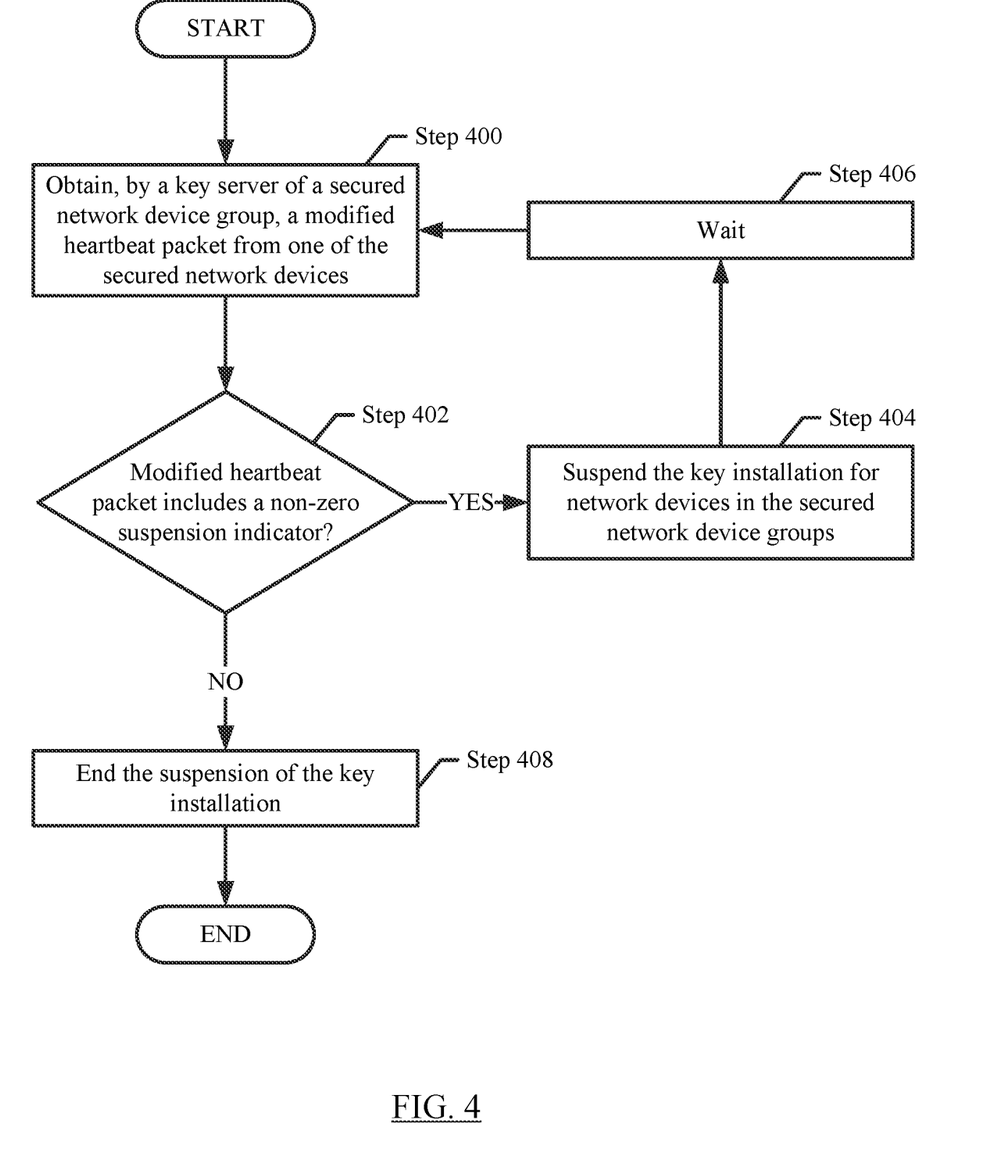
FIG. 4 shows a flowchart for a method for managing a key installation in accordance with one or more embodiments.

FIG. 4 shows a flowchart for a method for managing a key installation in accordance with one or more embodiments. The method of FIG. 4 may be performed by, for example, a key server (e.g., 124, FIG. 1). Other components illustrated in FIGS. 1-2 may perform the method of FIG. 4 without departing from the disclosure. Further, one or more steps in FIG. 4 may be performed concurrently with one or more steps in FIGS. 3-4.

In step 400, a modified heartbeat packet is obtained from a secured network device. In one or more embodiments, the modified heartbeat packet is one of the modified heartbeat packets generated in step 302 discussed above in FIG. 3. Alternatively, the modified heartbeat packet may be a new modified heartbeat packet generated in step 310.

In step 402, a determination is made about whether the modified heartbeat packet includes a non-zero suspension indicator. In one or more embodiments, the suspension indicator may be the suspension time of the modified heartbeat packet. As discussed above, the suspension time may be a numerical value indicating a period of time until a switchover is estimated to complete, and key installation may resume. If the modified heartbeat packet includes a non-zero suspension indicator, the method proceeds to step 404; otherwise, the method proceeds to step 408.

In step 404, following the determination that the modified heartbeat packet includes a non-zero suspension indicator, the key installation is suspended for all of the network devices in the secured network device group. In one or more embodiments, the key server waits the specified suspension time before ending the suspension. Alternatively, the key server continues to suspend the key installation and/or distribution until a modified heartbeat packet is obtained from the secured network device that indicates an end of the suspension.

In one or more embodiments, the suspension of the key installation and/or distribution includes not distributing any new SAKs to the secured network devices in the secured network device group. In this manner, the secured network devices may continue to utilize the most recent SAKs to communicate until the key server ends the suspension and distributes a new set of SAKs.

In step 406, the key server waits. The key server may wait a heartbeat interval. In one or more embodiments, the key server may wait until another modified heartbeat packet is obtained, as discussed in step 400.

In step 408, following the determination that the modified heartbeat includes a suspension indicator of zero, the key server ends suspension of the key installation. By ending the key installation, the key server may continue to implement the security policies to distribute and/or install SAKs to the secured network devices in the secured network device group.

If embodiments of the disclosure implement a constant suspension indicator (which may be a non-zero value) and a different constant value that indicates the end of the suspension (e.g., a value of zero), the step 402 includes determining whether the modified heartbeat packet includes a suspension indicator or a value that indicates the end of the suspension. If the modified heartbeat packet includes a suspension indicator, the process proceeds to step 404; otherwise, the process proceeds to step 408.

EXAMPLE

The following example is not intended to limit embodiments of the disclosure. Turning to the example, consider a scenario in which a MACsec group includes a key server and at least one other secured network device, and the secured network device includes an active supervisor and a standby supervisor that occasionally undergo switchovers. The key server implements security policies in accordance with the MACsec protocol. The security policies include performing a key installation every hour. Each key installation includes generating and distributing a new SAK. The new SAK is to be used by each secured network device in the MACsec group to perform encryption of packets to be distributed and decrypting obtained packets. The secured network device implements one of the security policies that includes sending a MKPDU (e.g., a heartbeat packet) to the key server every two seconds.

A switchover agent executing on the standby supervisor monitors the active supervisor to detect any failure by the active supervisor that would trigger a switchover to make the current standby supervisor the new active supervisor. At a first point in time, the switchover agent sends a first MKPDU that indicates standard operation (e.g., no switchover has been initiated). At a second point in time, the switchover agent detects a failure of the active supervisor, thus determining that a switchover is to be initiated. Based on the detection, the switchover agent generates a modified MKPDU that includes a suspension time of 120 seconds (e.g., a non-zero value). At a third point in time, which is two seconds after the first point in time, the switchover agent sends the modified MKDPU packet.

The key server receives the modified MKPDU, determines, using the suspension time, that the key installation should be suspended. The suspension includes not generating or distributing any new SAKs until after the secured network device indicates to end the suspension.

At a fourth point in time, which is two seconds after the third point in time, the switchover agent sends a second modified MKPDU (e.g., the third total MKPDU packet thus far) that specifies a suspension time of 118 seconds. The key server obtains this second modified MKPDU and continues to suspend the key installation based on the suspension time.

Between the fourth point in time and a fifth point in time, 110 seconds pass. During this period of time, the switchover network device continues to send a modified MKPDU every two seconds that specifies a suspension time that decreases in value by two from that of the previous modified MKPDU. At the fifth point in time, the switchover agent determines that the suspension time of eight seconds has reached a restart threshold. Based on the restart threshold, the switchover agent reevaluates the estimated time before the switchover is determined to be complete. The switchover agent determines that the switchover will not be complete within eight seconds. Based on this determination, the switchover agent sends a modified MKPDU that specifies a suspension time of 120 seconds. The key server obtains the modified MKPDU and continues to suspend the key installation based on the suspension time.

Between the fifth point in time and a sixth point in time, 30 more seconds pass. During this period of time, the switchover network device continues to send a modified MKPDU every two seconds that specifies a suspension time that decreases in value by two seconds from that of the previous modified MKPDU. At the sixth point in time, the switchover agent determines that the switchover is complete. Based on this determination, the switchover agent sends a modified MKPDU to the key server that specifies a suspension time of zero, instead of what would have been a suspension time of 90 seconds had the switchover agent not detected a completion of the switchover.

The key server obtains this modified MKPDU packet and, detecting that the modified heartbeat packet does not include a non-zero suspension time, ends the suspension. By ending the suspension, the key server resumes performance of the security policy, which requires the key server to distribute new keys every hour. If more than an hour has elapsed since the last key installation (e.g., the delay caused by suspending the key installation), then the key server may perform the key installation immediately after ending the suspension.

End of Example

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a group of secured network devices that implement a secured network communication protocol, the method comprising:
   detecting, by a switchover agent operating in a secured network device of the group of secured network devices, a switchover between a first supervisor and a second supervisor, wherein the first and second supervisors are part of the secured network device, and wherein the switchover causes the first supervisor to transition from an active state that involves managing one or more components of the secured network device to a standby state and causes the second supervisor to transition from the standby state to the active state; and
   in response to detecting the switchover between the first supervisor and the second supervisor:
      generating a modified heartbeat packet, wherein the modified heartbeat packet comprises a suspension time that is representative of an amount of time needed for the switchover to be completed and indicates, to a second secured network device of the group of secured network devices, a time period during which the second secured network device suspends one or more operations pertaining to the secured network communication protocol, and
      sending the modified heartbeat packet to the second secured network device.

2. The method of claim 1,
   wherein a key server is executing on the second secured network device, and
   wherein the modified heartbeat packet is used to inform the key server to suspend, during the suspension time, key installation to the group of secured network devices.

3. The method of claim 2, further comprising:
   after sending the modified heartbeat packet, making a first determination, based on monitoring the secured network device, that the switchover is not complete;
   based on the first determination, generating a second modified heartbeat packet, wherein the second modified heartbeat packet comprises a second suspension time that is less than the suspension time and greater than a heartbeat interval; and
   sending the second modified heartbeat packet to the key server to inform the key server to continue suspension of the key installation.

4. The method of claim 3, further comprising:
   after sending the second modified heartbeat packet, making a second determination, based on monitoring the secured network device, that the switchover is not complete;
   based on the second determination, generating a third modified heartbeat packet, wherein the third modified heartbeat packet comprises a second suspension time that is greater than the second suspension time; and
   sending the third modified heartbeat packet to the key server to inform the key server to continue suspension of the key installation.

5. The method of claim 2, further comprising:
   after sending the modified heartbeat packet, determining, based on monitoring the secured network device, that that the switchover is complete; and
   based on the determination, generating a second modified heartbeat packet, wherein the second modified heartbeat packet comprises a suspension time with a value of zero; and
   sending the second modified heartbeat packet to the key server to inform the key server to end suspension of the key installation.

6. The method of claim 1, wherein the secured network communication protocol is Media Access Control Security (MACsec) protocol and wherein the group of secured network devices operate as a MACsec group.

7. The method of claim 1, wherein the suspension time is a non-zero value.

8. The method of claim 6, wherein the modified heartbeat packet is a modified MACsec key agreement protocol data unit (MKPDU).

9. A secured network device of a group of secured network devices, the group of secured network devices implementing a secured network communication protocol, the secured network device comprising:
a first supervisor operating in an active state that involves managing one or more components of the secured network device;
a second supervisor operating in a standby state; and
a switchover agent, programmed to:
detect, a switchover between the first supervisor and the second supervisor, the switchover causing the first supervisor to transition from the active state to the standby state and the second supervisor to transition from the standby state to the active state; and
in response to detecting the switchover between the first supervisor and the second supervisor:
generate a modified heartbeat packet, wherein the modified heartbeat packet comprises a suspension indicator that is representative of an amount of time needed for the switchover to be completed and indicates, to a key server in the group of secured network devices, a time period during which the key server suspends one or more operations pertaining to the secured network communication protocol, the one or more operations including key installation to the group of secured network devices, and send the modified heartbeat packet to the key server.

10. The secured network device of claim 9, wherein the switchover agent is further programmed to:
after sending the modified heartbeat packet, make a determination, based on monitoring the secured network device, that the switchover is not complete;
based on the determination, generate a second modified heartbeat packet, wherein the second modified heartbeat packet comprises an updated suspension indicator; and
send the second modified heartbeat packet to the key server to inform the key server to continue suspension of the key installation.

11. The secured network device of claim 9, wherein the switchover agent is further programmed to:
after sending the modified heartbeat packet, make a determination, based on monitoring the secured network device, that the switchover is complete;
based on the determination, generate a second modified heartbeat packet, wherein the second modified heartbeat packet comprises an updated suspension indicator; and
sending the second modified heartbeat packet to the key server, wherein the updated suspension indicator informs the key server to end suspension of the key installation.

12. The secured network device of claim 9, wherein the suspension indicator is a non-zero value.

13. The secured network device of claim 9, wherein the secured network communication protocol is Media Access Control Security (MACsec) protocol and wherein the group of secured network devices operate as a MACsec group.

14. The secured network device of claim 13, wherein the modified heartbeat packet is a modified MACsec key agreement protocol data unit (MKPDU).

15. The secured network device of claim 9, wherein the switchover agent executes on the second supervisor.

16. A method for managing a secured network device in a group of secured network devices, the group of secured network devices implementing a secured network communication protocol, the method comprising:
obtaining a key from a key server in the group of secured network devices;
installing, by a first supervisor of the secured network device, the key, the first supervisor operating in an active state that involves managing one or more components of the secured network device;
after the installing, detecting, by a switchover agent of the secured network device, a switchover between the first supervisor and a second supervisor of the secured network device, wherein the switchover causes the first supervisor to transition from the active state to a standby state and the second supervisor to transition from the standby state to the active state;
in response to detecting the switchover between the first supervisor and the second supervisor:
generating a modified heartbeat packet, wherein the modified heartbeat packet comprises a suspension time that is representative of an amount of time needed for the switchover to be completed and indicates, to the key server, a time period during which the key server suspends one or more operations pertaining to the secured network communication protocol, and sending the modified heartbeat packet to the key server.

17. The method of claim 16, wherein the modified heartbeat packet is used to inform the key server to suspend, during the suspension time, a key installation of a second key to the secured network device.

18. The method of claim 16, wherein the key server is executing on a second secured network device in the group of secured network devices.

19. The method of claim 16, wherein the secured network communication protocol is Media Access Control Security (MACsec) protocol and wherein the secured network device operates using a MACSec protocol.

20. The method of claim 19, wherein the modified heartbeat packet is a modified MACsec key agreement protocol data unit (MKPDU).

* * * * *